(12) United States Patent
Zhou et al.

(10) Patent No.: US 9,971,182 B2
(45) Date of Patent: May 15, 2018

(54) TOUCH PANEL AND PREPARATION METHOD THEREFOR

(71) Applicant: LENS TECHNOLOGY (CHANGSHA) CO.,LTD, Changsha (CN)

(72) Inventors: Qunfei Zhou, Changsha (CN); Qiaobing Rao, Changsha (CN); Jiahui Chen, Changsha (CN)

(73) Assignee: Lens Technology (Changsha) Co., Ltd, Changsha (CN)

( * ) Notice: Subject to any disclaimer, the term of this patent is extended or adjusted under 35 U.S.C. 154(b) by 0 days. days.

(21) Appl. No.: 15/514,339

(22) PCT Filed: Sep. 10, 2015

(86) PCT No.: PCT/CN2015/089375
§ 371 (c)(1),
(2) Date: Mar. 24, 2017

(87) PCT Pub. No.: WO2016/045511
PCT Pub. Date: Mar. 31, 2016

(65) Prior Publication Data
US 2017/0285383 A1    Oct. 5, 2017

(30) Foreign Application Priority Data

Sep. 26, 2014  (CN) .......................... 2014 1 0504010

(51) Int. Cl.
*G02F 1/1333* (2006.01)
*G06F 3/041* (2006.01)
*G06F 3/044* (2006.01)

(52) U.S. Cl.
CPC .......... *G02F 1/13338* (2013.01); *G06F 3/041* (2013.01); *G06F 3/044* (2013.01);
(Continued)

(58) Field of Classification Search
CPC ........... G06F 3/041; G06F 2203/04103; G06F 3/0416; G06F 3/044; G06F 2203/04111; G02F 1/133512; G02F 1/13338
See application file for complete search history.

(56) References Cited

U.S. PATENT DOCUMENTS 6,407,783 B1 *   6/2002  Ohgawara ......... G02F 1/133512
                                                      349/110
2002/0005920 A1 *  1/2002  Sakamoto ......... G02F 1/133512
                                                      349/44
(Continued)

FOREIGN PATENT DOCUMENTS

CN       103092411 A      5/2013
CN       103164069 A      6/2013
(Continued)

OTHER PUBLICATIONS

State Intellectual Property Office of the P.R. China; International Search Report & Written Opinion for PCT/CN2015/089375, dated Dec. 2, 2015; 13 pages; Beijing, CN.
(Continued)

*Primary Examiner* — Richard Hong
(74) *Attorney, Agent, or Firm* — Henry Patent Law Firm PLLC

(57) ABSTRACT

A touch panel and a preparation method therefor, which relate to the technical field of electronic device preparation. The method for preparing a touch panel comprises: firstly, preparing a BM frame layer (1), and then sequentially preparing an ITO1 layer (2), an OC1 layer (3) and an ITO2 layer (4a, 4b) in the BM frame layer (1); then, preparing a window frame layer (5) outside the BM frame layer (1) by means of a printing process; and finally, preparing a designated metal wiring layer (6a, 6b) and an OC2 layer (7). The touch panel and the preparation method therefor solve the problem that a white window frame in the current industry
(Continued)

4a is yellowed easily. Compared with a yellow light lithography for preparing the window frame, the printing process for preparing the window frame is simpler in production process, higher in defect-free rate and lower in corresponding cost, and can reduce pollution from discharge of wastewater and waste gas generated by the chemical solution to the environment.

17 Claims, 6 Drawing Sheets

(52) U.S. Cl.
CPC .. *G06F 3/0416* (2013.01); *G06F 2203/04103* (2013.01); *G06F 2203/04111* (2013.01)

(56) References Cited

U.S. PATENT DOCUMENTS

| | | | |
|---|---|---|---|
| 2011/0242058 A1 | 10/2011 | Lee | |
| 2012/0188151 A1* | 7/2012 | Oh | G02F 1/133512 345/88 |
| 2013/0335345 A1* | 12/2013 | Liu | G06F 3/041 345/173 |

FOREIGN PATENT DOCUMENTS

| | | |
|---|---|---|
| CN | 103842948 A | 6/2014 |
| CN | 104007863 A | 8/2014 |
| CN | 104267848 A | 1/2015 |
| CN | 204189149 U | 3/2015 |
| CN | 203552213 U | 4/2017 |
| JP | 2010267223 | 11/2010 |
| JP | 2014021768 | 2/2014 |
| KR | 1020140081244 A | 7/2014 |

OTHER PUBLICATIONS

State Intellectual Property Office of the P.R. China; First Office Action and Search Report for CN 201410504010.9; dated Oct. 20, 2016; 6 pages; Beijing, CN.

JPO, Office Action dated Feb. 27, 2018, in JPA 2017-535950, with English translation (5 pages).

* cited by examiner

TOUCH PANEL AND PREPARATION METHOD THEREFOR

TECHNICAL FIELD

The disclosure relates to a touch panel and preparation method therefor, which belongs to the technical field of electronic device preparation.

RELATED ART

Currently, a conventional method of preparing the touch panel is such that:

Firstly, a large piece of clear glass substrate (generally of size 550*650 mm) is subjected to yellow light photolithography to obtain a window frame, and the large piece of clear glass substrate is then subjected to photoresist coating, pre-baking, exposure, development, post-baking, high temperature baking to obtain a designated window frame pattern;

Secondly, on the large piece of glass substrate where the window frame pattern is formed, a designated ITO1 (ITO Bridge) layer is obtained through a ITO1 processing, wherein the ITO1 layer mainly serves to have the transmitting or receiving shafts of the ITO2 connected and conductive, the preparation process of which is such that: the glass substrate with the window frame is plated with ITO film, and then subjected to coating (with Ruihong RZJ-390 protective photoresist material), pre-baking, exposure, development, post-baking, etching, film stripping (stripping off the Ruihong RZJ-390 protective photoresist layer retained on the ITO layer after etching) processes to obtain the designated ITO1 layer;

Thirdly, an OC1 layer process is further performed on the glass substrate which has been subjected to the above two steps to obtain the designated OC1 layer, wherein the OC1 layer (insulation layer) mainly serves to make the ITO1 layer connected and conductive exclusively with one of the transmitting or receiving shafts of the ITO2 layer and insulated from the other (for example, if connected and conductive with the transmitting shaft, then ITO1 layer is insulated from the receiving shaft, and if connected and conductive with the receiving shaft, then ITO1 layer is insulated from the transmitting shaft), the preparation process of which is such that: on the glass substrate which has been subjected to the above two steps, coating (with are Toray NS-E3150 photoresist material), pre-baking, exposure, development, post-baking, and high temperature baking processes are employed sequentially to obtain the designated OC1 layer;

Fourthly, on the glass substrate which has been subjected to the above three steps, an ITO2 layer process is further performed to obtain the designated ITO2 layer, wherein the transmitting or receiving shaft of the ITO2 layer is connected and conductive with ITO1 layer (if the transmitting shaft of the ITO2 layer is connected and conductive with the ITO1 layer, the receiving shaft of the ITO2 layer is insulated from the ITO1 layer via the OC1 layer; if the receiving shaft of the ITO2 layer is connected and conductive with the ITO1, the transmitting shaft of the ITO2 layer is insulated from the ITO1 layer via the OC1 layer), the preparation process of which is such that: on the glass substrate which has been subjected to the above three steps, ITO film plating, coating (with the Ruihong RZJ-390 protective photoresist material), pre-baking, exposure, development, post-baking, etching, and film stripping process (stripping off the Ruihong RZJ-390 protective photoresist layer retained on the ITO layer after etching) are performed to obtain the designated ITO2 layer;

Fifthly, a metal trace layer process is further performed on the glass substrate which has been subjected to the above four steps to obtain the designated metal trace layer, wherein the metal trace layer mainly serves to have the transmitting and receiving shafts of the ITO2 layer connected to a port of a processor with metal wires, the preparation process of which is such that: the glass substrate which has been subjected to the above four steps is plated with a metal film, and then subjected to coating (with Ruihong RZJ-390 protective photoresist material), pre-baking, exposure, development, post-baking, etching, film stripping (stripping off the Ruihong RZJ-390 protective photoresist layer retained on the ITO layer after etching) processes to obtain the designated metal trace layer;

sixthly, a protective layer (OC2 layer) process is further performed on the glass substrate which has been subjected to the above five steps to obtain the designated OC2 layer, wherein the OC2 layer mainly serves to protect the previously processed ITO and metal trace from oxidizing, the preparation process of which is such that: on the glass substrate which has been subjected to the above five steps, coating (with Toray NS-E3150 protective photoresist material), pre-baking, exposure, development, post-baking, and high temperature baking processes are employed sequentially to obtain the designated OC2 layer;

Seventhly, cutting and grinding and secondary strengthening processes are further performed on the large piece of the glass substrate for which the above six processes have been done, wherein the large piece of the glass substrate is cut into designated product dimensions of small pieces, and then a secondary edge enhancement is performed by using hydrofluoric acid chemical solution, finally completing the preparation of the touch panel.

In the existing process production, the yellow light photolithography on photosensitive photoresist materials is generally adopted to prepare the window frame layer. However, the process has drawbacks such as being cumbersome, low process yield, and high cost. Meanwhile, when a white photosensitive photoresist material is used, poor appearance problem such as yellowing appear, which restricts the development and production of the white window frame touch panel.

As can be seen from the above process as well, BM frame layer structure is not included in the structure of the existing touch panel and the ITO2 layer is provided with a metal wiring layer on its portion contacted with the window frame, wherein said metal wiring layer includes a metal wire (6b) and a metal rake-shaped wire (6a) which is directly above the window frame layer (5).

The meanings of the abbreviations used in the present disclosure:

ITO1 layer, an abbreviation for ITO Bridge (ITO bridging structure);
ITO2 layer, an abbreviation for ITO Pattern;
ITO set forth in ITO1 layer, ITO2 layer for indium tin oxide;
Metal Trace for a metal wire;
OC1 layer for insulation layer;
OC2 layer for protective layer;
OD for optical density value.

SUMMARY

The object of the present disclosure is to provide a touch panel and a method for preparing the same for the deficiencies of prior arts.

The present disclosure provides a touch panel, comprising a glass substrate, a window frame layer (5), an ITO1 layer (2), an OC1 layer (3), an ITO2 layer, a metal wiring layer and an OC2 layer (7); the ITO2 layer comprising a portion 4a which is directly contacted with the window frame layer and a portion 4b which is not in contact with the window frame, wherein a BM frame layer (1) is further provided on the substrate, the window frame layer (5) and the portion 4a of the ITO2 layer is contacted with each other on a upper surface of the BM frame layer (1); and the BM frame layer (1) has a width of 0.1 to 0.8 mm, and is made of a photosensitive material having an insulation resistance$\geq 10^{12}\Omega$.

The BM frame layer (5) mainly serves to shield a rake at the lap of metal trace in the post processes and the ITO2 so that the rake of the metal trace may not be seen from the touch surface.

The present disclosure provides a touch panel, wherein said metal wiring layer comprises a metal wire (6b); and a metal rake-shaped wire (6a) arranged at the portion 4a of the ITO2 layer and located directly above the BM frame layer (1). The metal rake (6a) of the metal wiring layer is positioned on a surface of the portion 4a that is away from the substrate. When the metal rake-shaped wire (6a) is projected along a plane perpendicular to the plane in which the substrate is situated, its projection passes through the portion 4a, the BM frame layer (1) and the glass substrate successively.

The present disclosure provides a touch panel, wherein said BM frame layer (1) has a thickness of 1.2±0.2 μm, an adhesion level of 5B, and a line width of 0.1-0.8 mm.

The present disclosure provides a touch panel, wherein said BM frame layer (1) is made of a photosensitive material having a viscosity of 2-8 CPS.

The present disclosure provides a touch panel, wherein said window frame layer (5) is lapped with the BM frame layer (1) in a step-like shape.

The present disclosure provides a touch panel, wherein said portion 4a is lapped with the BM frame layer (1) in a step-like shape.

The present disclosure provides a touch panel, wherein said window frame layer (5) and the portion 4a of said ITO2 layer are lapped on the upper surface (i.e., the surface away from the substrate) of the BM frame layer (1) in a step-like shape.

The present disclosure provides a touch panel, wherein said window frame layer (5) and the portion 4a of said ITO2 layer are lapped on the upper surface of the BM frame layer (1) in a step-like shape, and an end of the window frame layer (5) is contacted with an end of the portion 4a of the ITO2 layer.

The present disclosure provides a touch panel, wherein said window frame layer (5), ITO1 layer (2), OC1 layer (3), ITO2 layer, metal wiring layer and OC2 layer (7) on the substrate have a total thickness of 16.82-38 μm.

The present disclosure provides a touch panel, wherein said window frame layer (5) has a thickness of 12 μm-30 μm; said ITO1 layer (2) has a thickness of 100 Å-1500 Å; the OC1 layer (3) has a thickness of 0.5 μm-2.0 μm; the ITO2 layer has a thickness of 100 Å-1500 Å; the metal wiring layer has a thickness of 25000 Å-35000 Å; and the OC2 layer (7) has a thickness of 2.0±0.2 μm.

The present disclosure provides a touch panel, wherein each of said window frame layer (5), ITO1 layer (2), OC1 layer (3), ITO2 layer, metal wiring layer, and OC2 layer (7) has an adhesion level of 5B.

The present disclosure provides a method of preparing a touch panel comprising:

step one of preparing a designated BM frame layer (1) on a substrate by using a piece of clear glass as a substrate and a photosensitive material having a viscosity of 2-8 CPS and an insulation resistance$\geq 10^{12}\Omega$ as a raw material to obtain a first substrate;

step two of preparing a designated ITO1 layer (2), an OC1 layer (3), and an ITO2 layer successively on the first substrate in accordance with a designated pattern and position to obtain a second substrate, wherein on the second substrate, one end of the BM frame layer (1) is directly contacted with a portion (4a) of the ITO2 layer and the other end of the BM frame layer (1) is provided with a portion to be in contact with the window frame layer (5);

step three of printing an ink material having an insulation resistance$\geq 10^{12}\Omega$ on the second substrate by printing process according to the designated window frame pattern and position, and then baking the substrate under 200-300° C. for 20-40 minutes, so that the ink is cured, to obtain a third substrate with the window frame layer (5);

step four of preparing a designated metal wiring layer and OC2 layer (7) on the third substrate according to the designated pattern and position, to obtain the touch panel, wherein said metal wiring layer comprises a metal wire (6b) and a metal rake-shaped wire (6a), and the metal rake-shaped wire (6a) is provided on the portion (4a) of the ITO2 layer and is directly above the BM frame layer (1).

The present disclosure provides a method of preparing a touch panel, wherein the photosensitive material in the step one is Daxing DBM 115 photosensitive material.

The present disclosure provides a method of preparing a touch panel, wherein in the preparation of the BM frame in the step one, coating, pre-baking, exposure, development, post-baking, and baking processes are successively employed;

In step one, the parameters for the coating, pre-baking, exposure, development, post-baking, and baking processes are as follows:

in the coating, the parameters for the process are: coating rate 70±20 mm/s, the gap value (the distance between the blade for coating and the glass substrate) 0.1±0.03 mm, and the coating pressure 0.08±0.03 Mpa;

in the pre-baking, the pre-baking temperature is controlled at 110±10° C., and the pre-baking time is controlled at 25±1 s;

in the exposure, the exposure energy is controlled at 60±10 mj, the exposure gap value (the distance between the mask for exposure and the glass substrate) is controlled at 200±50 μm, and the temperature is controlled at 23+1° C.;

in the development, the temperature of the developer solution is controlled at 23±1° C., the conductivity is controlled at 10±2 ms/cm, and the flow rate is controlled at 4±0.5 m/min (the developer solution is 0.045% KOH solution);

in the post-baking, the post-baking temperature is controlled at 130±10° C., and the post-baking time is controlled at 25±1 s;

in the baking, the baking temperature is controlled at 230±10° C., and the time is controlled at 30±5 min.

The present disclosure provides a method of preparing a touch panel, wherein in step two, when preparing the ITO1 layer, a layer of designated ITO1 film having an adhesion level of 5B and a thickness of 100 Å-1500 Å is first deposited and formed by the magnetron sputtering technology, and then subjected to the yellow light photolithography with coating (with Ruihong RZJ-390 protective photosensitive material), pre-baking, exposure, development, post-baking, etching, film stripping (stripping off the Ruihong RZJ-390 protective photoresist on the ITO layer) processes to obtain the designated ITO1 layer. In the deposition and formation of the ITO film by the magnetron sputtering technology, the degree of vacuum is maintained between 0.1-1 pa, while controlling the temperature between 340-350° C., and controlling the ITO target power between 7-12 KW. In the coating, the coating rate is controlled at 70±20 mm/s, the gap value (the distance between blade for coating and the glass substrate) is controlled at 0.09-0.01 mm, and the coating pressure is controlled at 0.081±0.003 Mpa. In the pre-baking, the temperature is controlled at 120±10° C., and the pre-baking time is controlled at 25±1 sec). In the exposure, the exposure energy is controlled at 60±10 mj, the exposure gap value is controlled at 200±50 μm, and the exposure temperature is controlled at 23±1° C. In the development, the solution temperature is controlled at 23±1° C., the conductivity of the solution is controlled at 55.5±2 ms/cm, and the rate (the flow rate of the developer solution on the glass substrate) is controlled at 4±0.5 m/min (the developer solution is 2.38% TMAH solution, abbreviated for tetramethylammonium hydroxide solution). In the post-baking, the temperature is controlled at 130±10° C., and the post-baking time is controlled at 25±1 sec. In the etching, the solution temperature is controlled at 40±2° C., and the etching rate is controlled at 6±1 m/min (the etching liquid is a mixed acid of 24.3% hydrochloric acid and 2.8% nitric acid). In the film stripping, the solution temperature is controlled at 50±2° C., and the stripping rate is controlled at 2.5±1 m/min (the stripping liquid is 5% KOH or NaOH solution).

The present disclosure provides a method of preparing a touch panel, wherein in step two, when preparing the OC1 layer, a designated OC1 layer having a layer thickness of 1.25±0.2 μm is obtained by employing yellow light photolithography with coating, pre-baking, exposure, development, post-baking, and high temperature baking processes successively. In the coating (with Toray NS-E3150 protective photoresist material), the coating rate is controlled at 70±20 mm/s, the gap value (the distance between the blade for coating and the glass substrate) is controlled at 0.09±0.01 mm, and the coating pressure is controlled at 0.05±0.003 Mpa. In the pre-baking, the temperature is controlled at 120±10° C., and the pre-baking time is controlled at 25±1 sec. In the exposure, the exposure energy is controlled at 80±10 mj, the exposure gap value is controlled at 200±50 μm, and the exposure temperature is controlled at 23±1° C. In the development, the solution temperature is controlled at 23±1° C., the conductivity of the solution is controlled at 8±1.5 ms/cm, and the rate (the flow rate of the developer solution on the glass substrate) is controlled at 4±0.5 m/min (the developer solution is 0.26% KOH solution). In the post-baking, the temperature is controlled at 130±10° C., and the post-baking time is controlled at 25±1 sec. In the high temperature baking, the temperature is controlled at 240±10° C., and the time is controlled at 30±5 min.

The present disclosure provides a method of preparing a touch panel, wherein in step two, when preparing the ITO2 layer, a designated ITO1 layer (2) having a film thickness of 100 Å-1500 Å is obtained by employing the magnetron sputtering technology, and then subjected to yellow light photolithography with coating (with Ruihong RZJ-390 protective photosensitive material), pre-baking, exposure, development, post-baking, etching, and film stripping (stripping off the Ruihong RZJ-390 protective photoresist on the ITO layer) processes to obtain the designated ITO2 layer. In the deposition and formation of the ITO film by the magnetron sputtering technology, the degree of vacuum is maintained between 0.1-1 pa, while controlling the temperature between 340-350° C., and controlling the ITO target power between 8-12 KW. In the coating, the coating rate is controlled at 70±20 mm/s, the gap value (the distance between the blade for coating and the glass substrate) is controlled at 0.09±0.01 mm, and the coating pressure is controlled at 0.081±0.003 Mpa. In the pre-baking, the temperature is controlled at 120±10° C., and the pre-baking time is controlled at 25±1 sec. In the exposure, the exposure energy is controlled at 60±10 mj, the exposure gap value is controlled at 200±50 μm, and the exposure temperature is controlled at 23±1° C. In the development, the solution temperature is controlled at 23±1° C., the conductivity of the solution is controlled at 55.5±2 ms/cm, and the rate (the flow rate of the developer solution on the glass substrate) is controlled at 4±0.5 m/min (the developer solution is 2.38% TMAH solution, abbreviated for tetramethylammonium hydroxide solution). In the post-baking, the temperature is controlled at 130±10° C., and the post-baking time is controlled at 25±1 sec. In the etching, the solution temperature is controlled at 40±2° C., and the etching rate is controlled at 6±1 m/min (the etching liquid is a mixed acid of 24.3% hydrochloric acid and 2.8% nitric acid). In the film stripping, the solution temperature is controlled at 50±2° C., and the stripping rate is controlled at 2.5±1 m/min (the stripping liquid is 5% KOH or NaOH solution).

The present disclosure provides a method of preparing a touch panel, wherein in step two, each of the ITO1 layer (2), OC1 layer (3), and the ITO2 layer has an adhesion level of 5B.

The present disclosure provides a method of preparing a touch panel, wherein in step three, the printing process is as follows: a printing screen with a mesh size of 300-500, a tension of 20~28N and an emulsion thickness of 6-14 μm is used to evenly print an ink material with an insulation resistance≥$10^{12}Ω$ on the second substrate, through the slight pinhole penetration on the printing screen via a scraper, forming the designated window frame pattern, which is then subjected to high temperature baking for 20-40 minutes under 200-300 degrees so that the window frame pattern is cured on a large glass substrate, obtaining the third substrate. The OD value of the window frame layer is greater than or equal to 4, while the total ink thickness is within 30 μm, preferably 1-20 μm, further preferably 10-20 μm, further preferably 16-20 μm and the adhesion level is 5B. In case of a film thickness≥30 μm, the film thickness of the metal wiring layer in the subsequent process may not overcome the step difference of 30 μm or more, resulting in the risk of product function failure. In the range of OD value≥4, theoretically, it is desired that the thickness of the window frame pattern is as thin as possible.

The present disclosure provides a method of preparing a touch panel, wherein the window frame layer (5) obtained in step three has a layer thickness of 12-30 μm, an optical density (simply referred to OD value)≥4, and an adhesion level of 5B.

The present disclosure provides a method of preparing a touch panel, wherein in the step three, when printing a non-white window frame layer, the non-white window frame layer is prepared by one or more printing processes. In more than one printing, the overall thickness of the window frame pattern (overall thickness of the black window frame pattern) is guaranteed less than or equal to 20 μm, the adhesion level is 5B, and the OD value≥4.

The present disclosure provides a method of preparing a touch panel, wherein in step three, when the white window frame layer is prepared by printing, a white ink layer is first printed and a black ink layer is then printed.

The white ink layer has a thickness of 9 μm-21 μm and the black ink layer has a thickness of 3 μm-9 μm. The overall ink layer thickness is 12 μm-30 μm.

For the conventional printing materials, a film thickness at one printing is generally 7-10 μm, and thus the preparation of white window frame by printing three white layers and one black layer would lead to an overall thickness of 28-40 μm, resulting in a risk of a severely excessive film thickness. Hence, in the present invention, a screen printing with a mesh size of 300-500, a tension of 20-28N, and an emulsion thickness of 6-14 μm is used during a process of printing three white layers and one black layer, so as to obtain a window frame layer having a film thickness of 12-30 μm, an optical density≥4, and an adhesion level of 5B.

The present disclosure provides a method of preparing a touch panel, wherein in step four, when preparing the designated metal wiring (metal trace) layer, the process is as follows: an entire layer of metal film is deposited and formed on the large glass substrate with the window frame pattern formed, by employing the magnetron sputtering technology, so that the adhered metal film has an adhesion level of 5B and a film thickness of 25000 Å-35000 Å, and then subjected to yellow light photolithography with coating (with Ruihong RZJ-390 protective photosensitive material), pre-baking, exposure, development, post-baking, etching, film stripping (stripping off the Ruihong RZJ-390 protective photoresist on the ITO layer) processes to obtain the designated metal trace layer. In the deposition and formation of the metal film by the magnetron sputtering technology, the degree of vacuum is maintained between 0.1-1 pa, while controlling the temperature between 70-80° C., and controlling the metal target power≤10 KW. In the coating, the coating rate is controlled at 70±20 mm/s, the gap value (the distance between the blade for coating and the glass substrate) is controlled at 0.09±0.01 mm, and the coating pressure is controlled at 0.081±0.003 Mpa. In the pre-baking, the temperature is controlled at 120±10° C., and the pre-baking time is controlled at 25±1 sec. In the exposure, the exposure energy is controlled at 60±10 mj, the exposure gap value is controlled at 200±50 μm, and the exposure temperature is controlled at 23±1° C. In the development, the solution temperature is controlled at 23±1° C., the conductivity of the solution is controlled at 55.5±2 ms/cm, and the rate (the flow rate of the developer solution on the glass substrate) is controlled at 4±0.5 m/min (the developer solution is 2.38% TMAH solution, abbreviated for tetramethylammonium hydroxide solution). In the post-baking, the temperature is controlled at 130±10° C., and the post-baking time is controlled at 25±1 sec. In the etching, the solution temperature is controlled at 40±2° C., and the etching rate is controlled at 6±1 m/min (the etching liquid is a mixed solution of 65.0±1.5% phosphoric acid ($H_3PO_4$), 6.5±0.5% nitric acid ($HNO_3$), 9.5±1.0% acetic acid ($CH_3COOH$)). In the film stripping, the solution temperature is controlled at 50±2° C., and the stripping rate is controlled at 2.5±1 m/min (the stripping liquid is pure N-methylpyrrolidone solution, the chemical formula of which is $C_5H_9NO$).

The present disclosure provides a method of preparing a touch panel, wherein in step four, when preparing the protective layer (OC2), the process is as follows: the coating, pre-baking, exposure, development, post-baking, and high temperature baking processes are employed on the large glass substrate with the metal trace layer successively to obtain a designated OC2 layer having a film thickness of 2.0±0.2 μm and an adhesion level of 5B. In the coating (with Toray NS-E3150 protective photoresist material), the coating rate is controlled at 70±20 mm/s, the gap value (the distance between the blade for coating and the glass substrate) is controlled at 0.09-0.01 mm, and the coating pressure is controlled at 0.081±0.003 MPa. In the pre-baking, the temperature is controlled at 120±10° C., and the pre-baking time is controlled at 25±1 sec. In the exposure, the exposure energy is controlled at 80±10 mj, the exposure gap value is controlled at 200±50 μm, and the exposure temperature is controlled at 23±1° C. In the development, the solution temperature is controlled at 23±1° C., the conductivity of the solution is controlled at 8±1.5 ms/cm, and the rate (the flow rate of the developer solution on the glass substrate) is controlled at 4±0.5 m/min (the developer solution is 0.26% KOH solution). In the post-baking, the temperature is controlled at 130±10° C., and the post-baking time is controlled at 25±1 sec. In the high temperature baking, the temperature is controlled at 240±10° C., and the time is controlled at 30±5 min.

The present disclosure provides a method of preparing a touch panel, wherein the metal wiring layer has a thickness of 25000 Å-35000 Å; the OC2 layer (7) has a thickness of 2.0±0.2 μm; and both of the metal wiring layer and the OC2 layer have an adhesion level of 5B.

The present disclosure provides a method of preparing a touch panel, which may be used to prepare a touch panel with colored window frame.

The present disclosure provides a method of preparing a touch panel, wherein the touch panel obtained in step four is cut and grinded into small pieces of product size, and then subjected to a secondary edge enhancement by hydrofluoric acid chemical solution to obtain a finished product. In the cutting and grinding, the pressure is controlled at 0.4-0.9 Mpa, the cutting depth is controlled at −0.03 to −0.07 mm, the grinding rod speed is controlled at 30000-42000 r/min, and the edge grinding feed amount is controlled at 12-15 mm/s.

Principles and Advantages

In the invention, the BM frame layer (1) is first prepared, and the ITO1 layer (2), the OC1 layer (3), and the ITO2 layer (including 4a and 4b) are then successively prepared in the BM frame layer. Next, the window frame layer (5) is prepared outside the BM frame layer (1) by printing processes, and then the designated metal wiring (metal trace) layer (including 6a and 6b) and the OC2 layer (7) are finally prepared. The BM frame layer not only serves to shield a rake at the lap of the metal trace and the ITO2 in the post processes so that the rake of the metal trace may not be seen from the touch surface, but also provides a reference for positioning for the subsequent processes. By first preparing the ITO1 layer (2), the OC1 layer (3), the ITO2 layer (including 4a, 4b), and then preparing the window frame layer (5) by the printing process, it is possible to avoid the possibility of the window frame layer (5) subjected to high temperature heating, thereby ensuring the stability of the tone of the window frame layer, particularly when preparing white window frame layer. In the prior arts implementation, the window frame layer (5) is first prepared and then the ITO1 layer (2), the OC1 layer (3), ITO2 layer (including 4a, 4b). There is necessarily a heating process with temperature higher than 300° C. during the preparation of ITO1 layer (2) and ITO2 layer (3), but the white window frame layer is prone to the phenomenon of yellowing once under the condition of a temperature higher than 300° C., as a result of which it is difficult to prepare a touch panel with white window frame pattern using the existing processes. At the same time, the invention employs printing process to prepare the window frame pattern, and has the advantages of simple production process, higher yield, low cost and small environmental pollution compared with the conventional method for preparing the window frame layer by using the yellow light photolithography.

BRIEF DESCRIPTION OF THE DRAWINGS

In FIG. 1, 2 is the ITO1 layer, 3 is the OC1 layer, 4a is a portion in the ITO2 layer that is directly contacted with the window frame; 4b is a portion in the ITO2 layer that is not contacted with the window frame, 5 is the window frame layer, 6b is a metal wire in the metal wiring layer, 6a is a metal rake-shaped wire in the metal wiring layer (6a and 6b constitute the entire metal wiring layer, with 6a and 6b being connected), 7 is the OC2 layer. As can be seen from FIG. 1, 4a is directly contacted with the window frame Layer 5. When 6a is projected along a plane perpendicular to the plane in which the substrate is situated, its projection passes through the portion 4a, the window frame layer and the glass substrate successively.

In FIG. 2, 3, 1 is the BM frame layer, 2 is the ITO1 layer, 3 is the OC1 layer, 4a is a portion in the ITO2 layer that is directly contacted with the window frame; 4b is a portion in the ITO2 layer that is not contacted with the window frame, 5 is the window frame layer, 6b is the metal wire in the metal wiring layer, 6a is the metal rake-shaped wire in the metal wiring layer, 7 is the OC2 layer. As can be seen from FIG. 2, the BM frame layer lies between the portion 4a and the window frame, and is in direct contact with the portion 4a, the window frame, and the substrate. When 6a is projected along a plane perpendicular to the plane in which the substrate is situated, its projection passes through the portion 4a, the BM frame layer and the glass substrate successively. A contact portion of the window frame layer 5 and the BM frame layer 1 is stepped. And a contact portion of the portion 4a and the BM frame layer 1 is stepped. When cutting the touch panel along a plane perpendicular to the plane in which the substrate is situated, the window frame layer (5) and the portion 4a are in contact on the surface of the BM frame layer away from the substrate.

Figure 1:
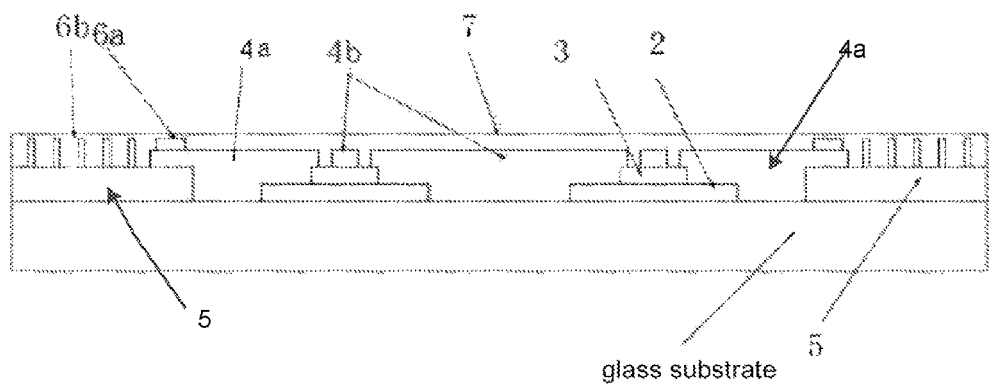
FIG. 1 is a position map of stacking connection relations among a window frame layer (5), an ITO1 layer (2), an OC1 layer (3), an ITO2 layer (including 4a, 4b), a metal wiring layer (including 6a, 6b), an OC2 layer (7) on a glass substrate in the touch panel prepared according to prior arts.
Figure 2:
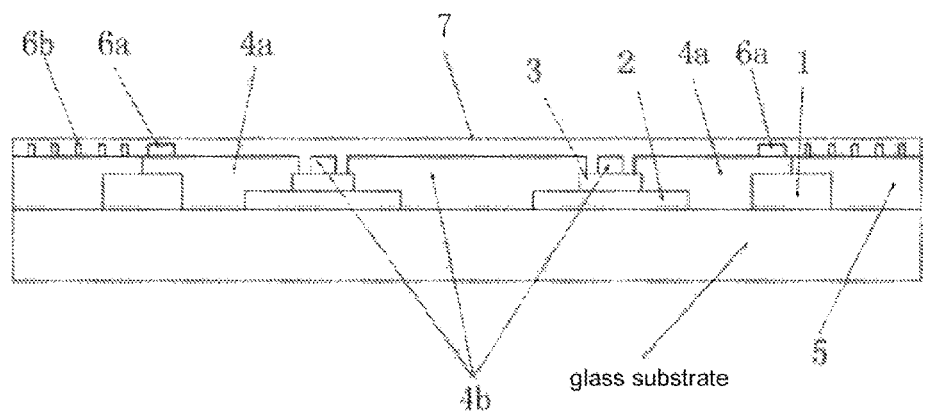
FIG. 2 is a position map of stacking connection relations among a BM frame layer (1), an ITO1 layer (2), an OC1 layer (3), an ITO2 layer (including 4a, 4b), a window frame layer (5), a metal wiring layer (including 6a and 6b), an OC2 layer (7) on a glass substrate in the touch panel prepared according to the present disclosure.
Figure 3:
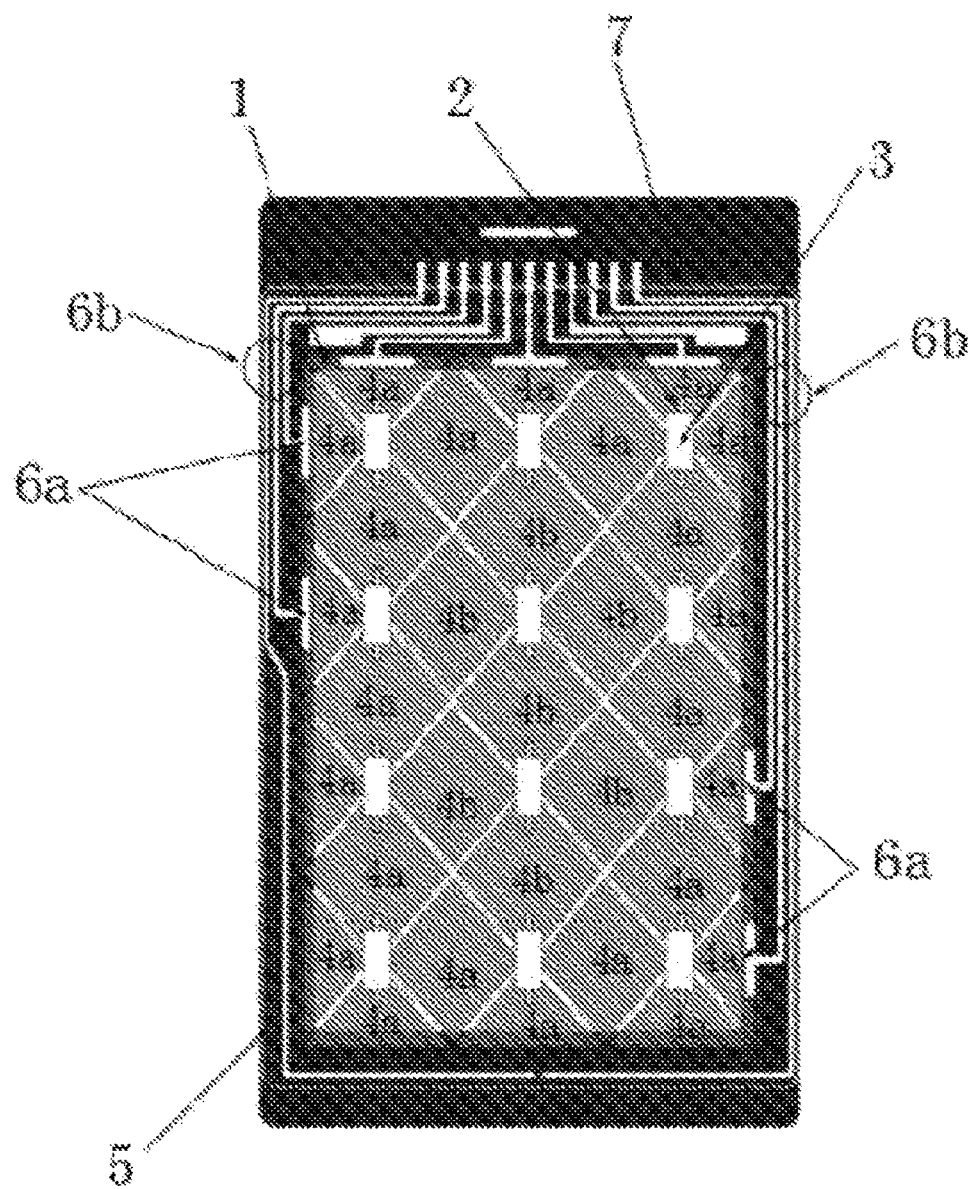
FIG. 3 is an overall plan view of a touch panel prepared according to the present disclosure.

As can be seen from FIGS. 1, 2 and 3, the positional and connection relationships among the components 4b, 2, 3, 7 in the touch panel designed according to the present invention are the same as those among corresponding components of the touch panel developed according to prior arts.

Figure 4:
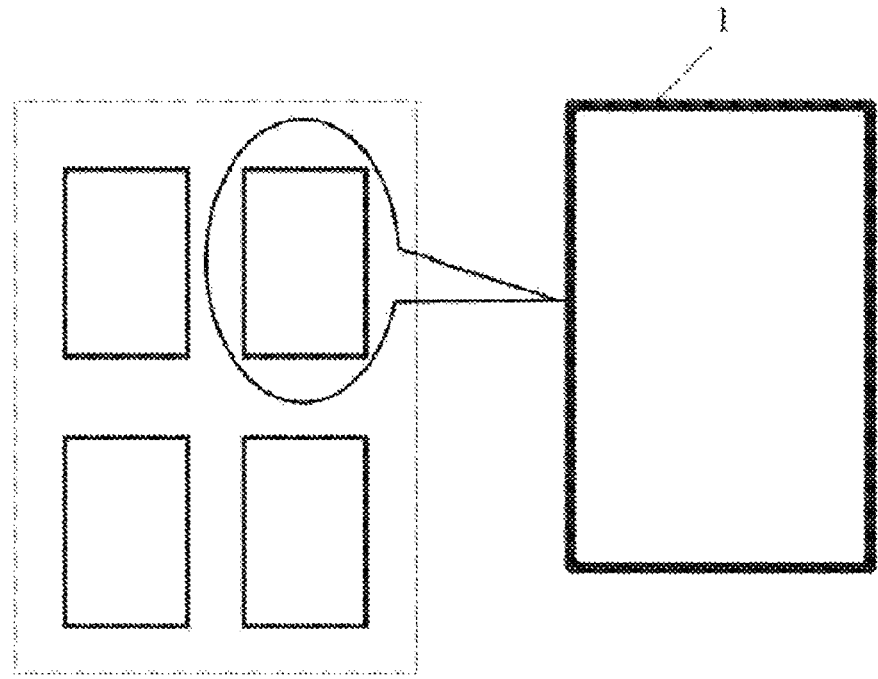
FIG. 4 is a schematic view of the BM layer prepared according to the present disclosure.

In FIG. 4, 1 is the BM frame layer; in the present disclosure, this layer is first prepared.

Figure 5:
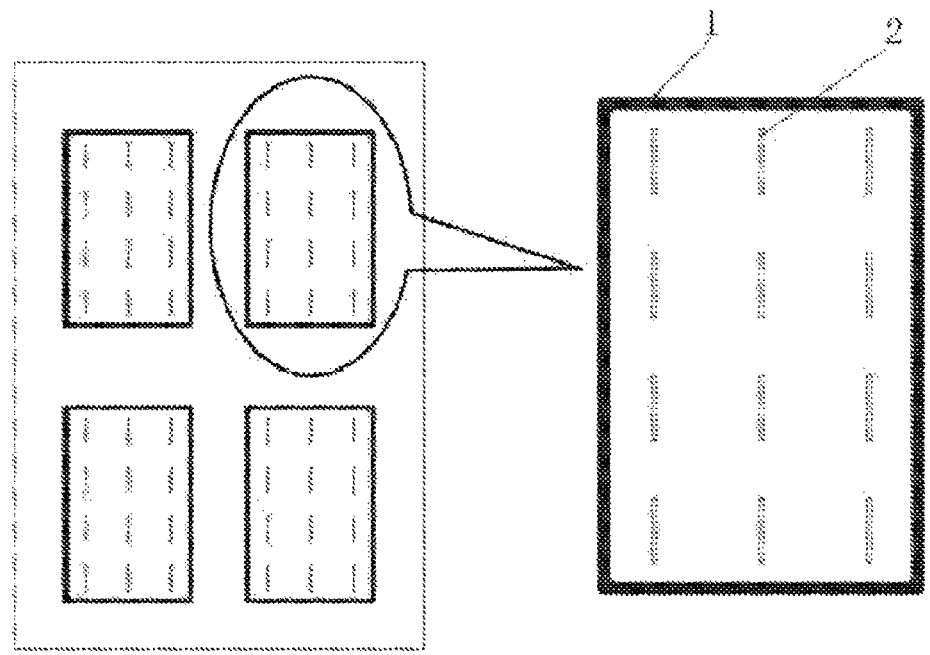
FIG. 5 is a schematic view of the ITO1 layer prepared according to the present disclosure.

In FIG. 5, 1 is the BM frame layer and 2 is the ITO1 layer. As can be seen from FIG. 2, the ITO1 layer of the present invention has a size and position that match with those of the ITO1 layer in the touch panel prepared according to prior arts.

Figure 6:
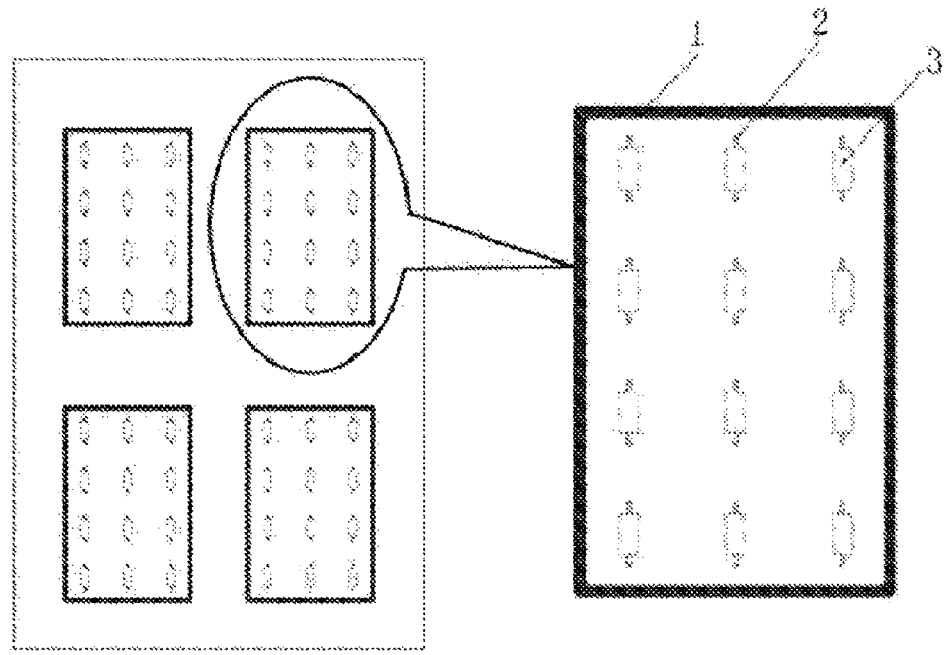
FIG. 6 is a schematic view of the OC1 layer prepared according to the present disclosure.

In FIG. 6, 1 is the BM frame layer, 2 is the ITO1 layer, and 3 is the OC1 layer.

Figure 7:
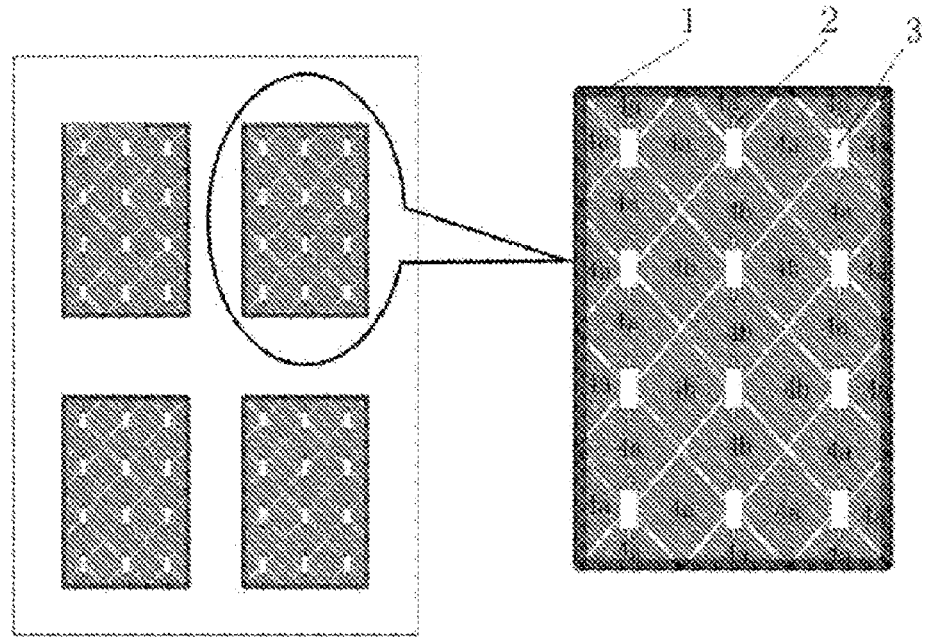
FIG. 7 is a schematic view of the ITO2 layer prepared according to the present disclosure.

In FIG. 7, 1 is the BM frame layer, 2 is the ITO1 layer, 3 is the OC1 layer, 4a is the portion in the ITO2 layer that is in direct contact with the BM frame layer, and 4b is the portion in the ITO2 layer that is not in direct contact with the BM frame layer. 4a and 4b constitute the entire ITO2 layer. As can be seen from FIG. 3, the dimensions of the ITO1 layer, the OC1 layer, the ITO2 layer designed according to the present invention and how they are connected match with those of the ITO1 layer, the OC1 layer, the ITO2 layer in the touch panel prepared according to prior arts.

Figure 8:
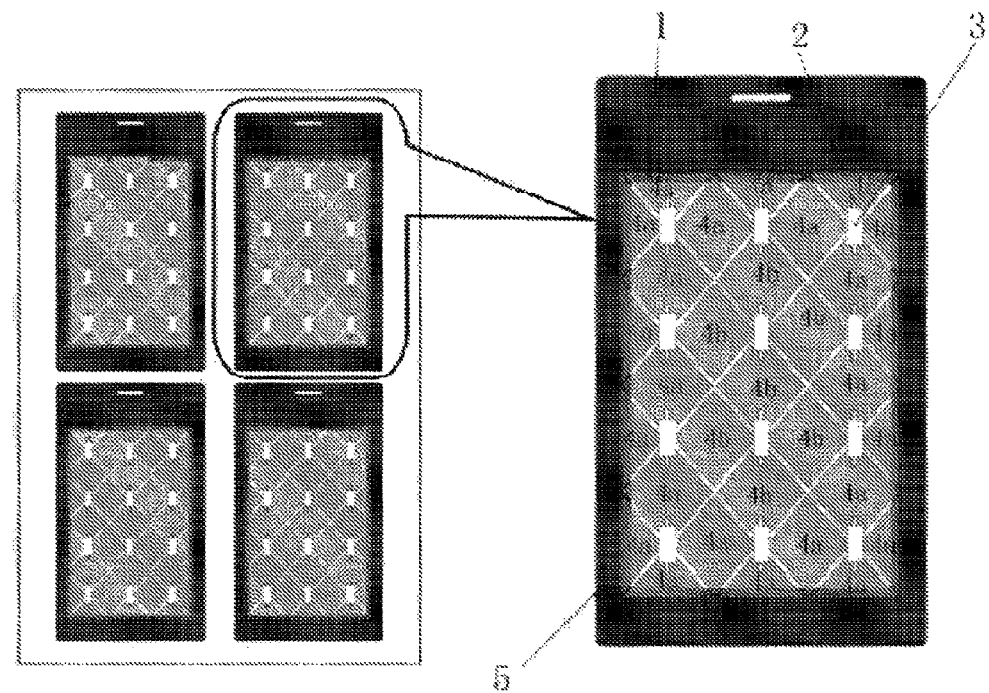
FIG. 8 is a schematic view of a window frame layer prepared according to the present disclosure.

In FIG. 8, 1 is the BM frame layer, 2 is the ITO1 layer, 3 is the OC1 layer, 4a is the portion in the ITO2 layer that is in direct contact with the BM frame layer, and 4b is the portion in the ITO2 layer that is not in direct contact with the BM frame layer, 4a and 4b constitute the entire ITO2 layer; 5 is the window frame.

Figure 9:
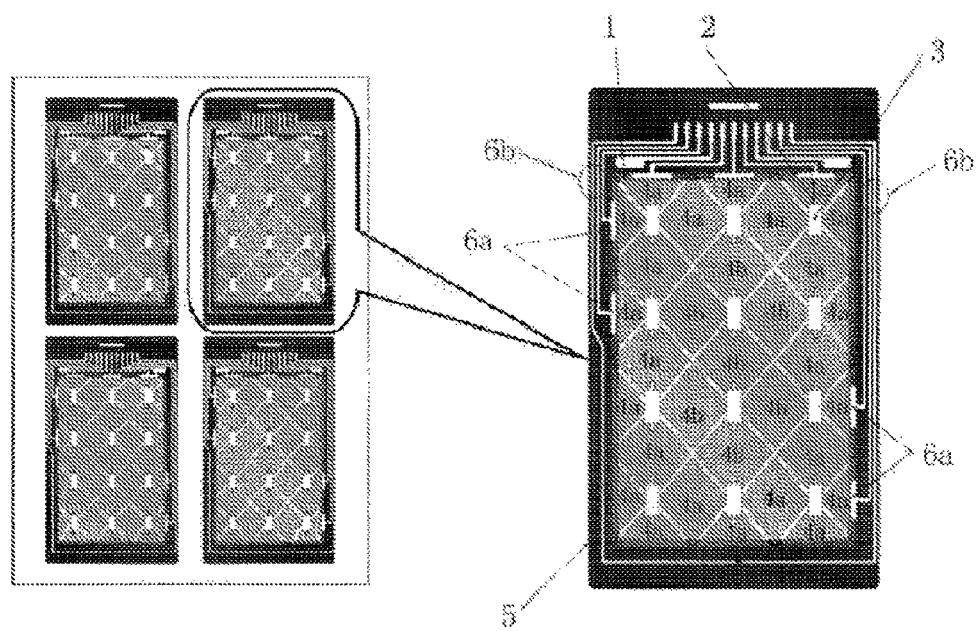
FIG. 9 is a schematic view of the metal wiring layer prepared according to the present disclosure.

In FIG. 9, 1 is the BM frame layer, 2 is the ITO1 layer, 3 is the OC1 layer, 4a is the portion of the ITO2 layer that is in direct contact with the BM frame layer, and 4b is the portion of the ITO2 layer that is not in direct contact with the BM frame layer, 4a and 4b constitute the entire ITO2 layer; 5 is the window frame; 6a is the metal rake-shaped wire in the metal wiring layer, 6b is the metal wire in the metal wiring layer (6a and 6b constitute the entire metal wiring layer, and 6a and 6b are connected). When 6a is projected along a plane perpendicular to the plane in which the substrate is situated, its projection passes through the portion 4a, the BM frame layer and the glass substrate successively. 6b is provided on the window frame.

Figure 10:
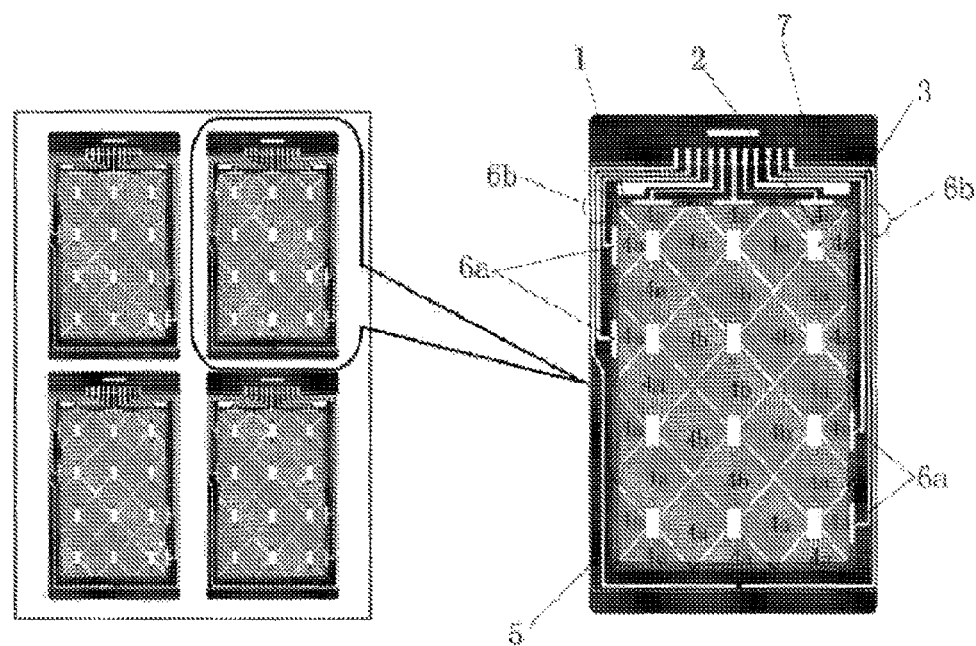
FIG. 10 is a schematic view of the OC2 layer prepared according to the present disclosure.

In FIG. 10, 1 is the BM frame layer, 2 is the ITO1 layer, 3 is the OC1 layer, 4a is the portion in the ITO2 layer that is in direct contact with the BM frame layer, and 4b is the portion in the ITO2 layer that is not in direct contact with the BM frame layer, 4a and 4b constitute the entire ITO2 layer; 5 is the window frame; 6a is the metal rake-shaped wire in the metal wiring layer, 6b is the metal wire in the metal wiring layer; 7 is the OC2 layer. As can be seen from FIG. 10, the touch panel designed according to the present invention is significantly different from the prior art by the addition of the BM frame and the components contacted with the BM frame, while other components have the same positional relationship, connection relationship, and dimensions as those of prior arts.

FIGS. 4-10 may also show the fabrication sequence of the touch panel prepared according to the present invention.

The invention will now be further described with reference to detailed embodiments.

DETAILED DESCRIPTION

Specifically, white window frame printing is implemented as follows: printing three white layers and one black layer, wherein a first white ink layer employs screen printing with a screen tension of 28N, an emulsion thickness of 6-8 μm, and a mesh size of 355.6, a second white ink layer employs screen printing with a screen tension of 26N, an emulsion thickness of 6-8 μm, and a mesh size of 304.8, a third white ink layer employs screen printing with a screen tension of 27N, an emulsion thickness of 6-8 μm, a mesh size of 304.8, a fourth black ink layer employs screen printing with a screen tension of 25N, an emulsion thickness of 6-10 μm, and a mesh size of 355.6, resulting a window frame layer with a film thickness of 22±2 μm, an optical density value≥4, and an adhesion level of 5B.

In conjunction with FIGS. 4-10, a method of preparing a touch panel for mobile using a printing technique is as follows:

Firstly, a DBM 115 BM photoresist material with a viscosity of 2.6 CPS and an insulation resistance≥$10^{12}$Ω is subjected to coating, pre-baking, exposure, development, post-baking, and high temperature baking to form the designated BM frame layer (1), the film thickness of which is required at 1.2±0.2 μm, with an adhesion level of 5B and a line width of 0.5±0.05 mm, as shown in FIG. 4;

Secondly, on the obtained BM layer, the magnetron sputtering technology is used while maintaining the degree of vacuum of the magnetron sputtering device between 0.1-1 pa, controlling the temperature between 340-350° C., and controlling the ITO target power between 7-12 KW, to deposit a layer of ITO film, so that the adhesion for the adhered ITO film is 5B. Then, as shown in FIG. 5, the designated ITO1 layer (2) is formed, by employing the yellow light photolithography with coating (with Ruihong RZJ-390 protective photoresist material, coating rate: 70±20 mm/s, gap value: 0.09-0.01 mm, coating pressure: 0.081±0.003 Mpa), pre-baking (constant temperature setting: 120±10° C., Tact time setting: 25±1 sec), exposure (exposure energy: 60±10 mj, exposure gap value: 200±50 μm, Stage temperature: 23±1° C.), development (solution temperature: 23±1° C., conductivity: 55.5±2 ms/cm, rate: 4±0.5 m/Min, the developer solution is 2.38% TMAH solution, abbreviated for tetramethylammonium hydroxide solution), post-baking (constant temperature setting: 130±10° C., Tact time setting: 25±1 sec), etching (solution temperature: 40±2° C., etching rate: 6±1 m/min, the etching liquid is a mixed acid of 24.3% hydrochloric acid and 2.8% nitric acid, also known as aqua regia), film stripping (the stripping liquid is 5% KOH or NaOH solution, stripping off the Ruihong RZJ-390 protective photoresist on the ITO layer, solution temperature: 50±2° C., process rate: 2.5±1 m/min);

Thirdly, on the obtained ITO1 layer, as shown in FIG. 6, a OC1 layer (3) with film thickness of 1.25±0.2 μm is obtained, by employing yellow light photolithography with coating (Toray NS-E3150 protective photoresist material, coating rate: 70±20 mm/s, gap value: 0.09-0.01 mm, coating pressure: 0.05±0.003 MPa), pre-baking (constant temperature setting: 120±10° C., Tact time: 25±1 sec), exposure (exposure energy: 80±10 mj, exposure gap value: 200±50 μm, Stage temperature: 23±1° C.), development (solution temperature: 23±1° C., conductivity: 8±1.5 ms/cm, rate: 4±0.5 m/min, the developer solution is 0.26% KOH solution), post-baking (constant temperature setting: 130±10° C., Tact time: 25±1 sec), high temperature baking (constant temperature setting: 240±10° C., set time: 30±5 min);

Fourthly, on the obtained OC1 layer, film plating and yellow light photolithography are employed to prepare the ITO2 layer. The magnetron sputtering device is used while maintaining the degree of vacuum of the magnetron sputtering device between 0.1-1 pa, controlling the temperature between 340-350° C., and controlling the ITO target power between 8-12 KW, to deposited a layer of ITO film, so that the adhesion for the adhered ITO film on the large glass substrate is 5B. Then, as shown in FIG. 7, the designated ITO2 layer (including portions 4a and 4b) is formed, by employing the yellow light photolithography with coating (Ruihong RZJ-390 protective photoresist material, coating rate: 70±20 mm/s, gap value: 0.09±0.01 mm, coating pressure: 0.081±0.003 Mpa), pre-baking (constant temperature setting: 120±10° C., Tact time: 25±1 sec), exposure (exposure energy: 60±10 mj, exposure gap value: 200±50 μm, Stage temperature: 23±1° C.), development (solution temperature: 23±1° C., conductivity: 55.5±2 ms/cm, rate: 4±0.5 m/min, the developer solution is 2.38% TMAH solution, abbreviated for tetramethylammonium hydroxide solution), post-baking (constant temperature setting: 130±10° C., Tact time setting: 25±1 sec), etching (solution temperature: 40±2° C., etching rate: 6±1 m/min, the etching liquid is a mixed acid of 24.3% hydrochloric acid and 2.8% nitric acid, also known as aqua regia), and film stripping (the stripping liquid is 5% KOH or NaOH solution, stripping off the Ruihong RZJ-390 protective photoresist on the ITO layer, solution temperature: 50±2° C., process rate: 2.5±1 m/min);

Fifthly, a printing screen with a mesh size of 300-500, a tension of 20-28N and an emulsion thickness of 6-14 μm is used to evenly print a THK-710 ink material with an insulation resistance≥$10^{12}$Ω on a large glass substrate, through the slight pinhole penetration on the printing screen via a scraper, forming the designated window frame pattern. The window frame pattern is then subjected to high temperature baking for 20-40 minutes under 200-300 degrees, so that it is cured on the large glass substrate, obtaining the window frame layer (5). The OD value of the window frame layer is greater than or equal to 4, while the total ink thickness is within 12-30 μm and the adhesion is 5B, as shown in FIG. 8;

Sixthly, on the large glass substrate on which the window frame layer has been prepared, the magnetron sputtering technology is used while maintaining the degree of vacuum of the magnetron sputtering device between 0.1-1 pa, controlling the temperature between 70-80° C., and controlling the metal target power≤10 kw, to deposit an entire layer of metal layer film, so that the adhesion of the adhered metal layer film on the large glass substrate is 5B, and film thickness is controlled at around 30000 Å. Then, as shown in FIG. 9, the designated metal wiring layer (Metal Trace, including 6a and 6b) is formed, by employing the yellow light photolithography with coating (Ruihong RZJ-390 protective photoresist material, coating rate: 70±20 mm/s, gap value: 0.09-0.01 mm, coating pressure: 0.081±0.003 MPa), pre-baking (constant temperature setting: 120±10° C., Tact time: 25±1 sec), exposure (exposure energy: 60±10 mj, exposure gap value: 200±50 μm, Stage temperature: 23±1° C.), development (the developer solution is 2.38% TMAH solution, abbreviated for tetramethylammonium hydroxide solution, solution temperature: 23±1° C., conductivity: 55.5±2 ms/cm, rate: 4±0.5 m/min), post-baking (constant temperature setting: 130±10° C., Tact time: 25±1 sec), etching (etching liquid is a mixed solution of 65.0±1.5% phosphoric acid ($H_3PO_4$), 6.5±0.5% nitric acid ($HNO_3$), 9.5±1.0% acetic acid ($CH_3COOH$), solution temperature: 40±2° C., etching rate: 4±0.5 m/min), and film stripping (stripping off the Ruihong RZJ-390 protective photoresist on the metal layer, solution temperature: 50±2° C., process rate: 2.5±1 m/min);

Seventhly, on the large glass substrate with a metal wiring layer (6), as shown in FIG. 10, the designated OC2 layer is obtained, with the film thickness of 2.0±0.2 μm and the adhesion of 5B, by employing the yellow light photolithography with coating (Toray NS-E3150, coating rate: 70±20 mm/s, gap value: 0.09±0.01 mm), pre-baking (constant temperature setting: 120±10° C., Tact time: 25±1 sec), exposure (exposure energy: 80±10 mj, exposure gap value: 200±50 μm, Stage temperature: 23±1° C.), development (the developer solution is 0.26% KOH solution, solution temperature: 23±1° C., conductivity: 8±1.5 ms/cm, rate: 4±0.5 m/min), post-baking (constant temperature setting: 130±10° C., Tact time: 25±1 sec), and high temperature baking (constant temperature setting: 240±10° C., set time: 30±5 min);

Eighthly, the large glass substrate to which the above-mentioned procedures have been done is then subjected to cutting and grinding and secondary strengthening processes. Specifically, the large glass substrate is cut and grinded into small pieces of designated product size, with the cutting pressure set at 0.4-0.9 Mpa, the cutting depth set between −0.03 and −0.07 mm, the grinding rod speed set at 30000-42000 r/min, and the edge grinding feed amount set at 12-15 mm/s. In this example, the cutting pressure is set to 0.75 Mpa, the cutting depth is set to −0.06 mm, the rotation speed is set at 39000 r/min, and the edge grinding feed amount is set to 13 mm/s. Then, the secondary edge strengthening is performed using hydrofluoric acid chemical solution, finally finishing the preparation of the touch panel, as shown in FIGS. 2 and 3.

The touch panel of this embodiment is different from that prepared according to the existing yellow light photolithography technology as shown in Table 1. Its main advantages are as follows: the problem of the occurrence of yellowing and other poor appearance of the white window frame photoresist material after experiencing ITO high temperature (300° C. or higher) film plating process can be solved. At the same time, in comparison with the yellow light photolithography, the use of printing process to prepare the window frame will lead to simpler production process, higher yield, and correspondingly lower cost, which may reduce the wastewater and exhaust gas pollution of yellow light chemical solution to the environment, as shown in Table 1 below.

The foregoing is merely illustrative of the preferred embodiments of the present invention and is not intended to limit the present invention, and various changes and modifications may be made by those skilled in the art. Any modifications, equivalent substitutions, improvements, and the like within the spirit and principles of the invention will be included within the scope of the present invention.

The invention claimed is:

1. A touch panel, comprising a glass substrate, a window frame layer, an ITO1 layer, an OC1 layer, an ITO2 layer, a metal wiring layer, and an OC2 layer, the ITO2 layer comprising a first portion which is directly contacted with the window frame layer and a second portion which is not in contact with the window frame layer, wherein:
   a BM frame layer is further provided on the substrate, the window frame layer and the first portion of the ITO2 layer is contacted with each other on a upper surface of the BM frame layer, and the BM frame layer has a width of 0.1 mm to 0.8 mm and is made of a photosensitive material having an insulation resistance≥$10^{12}Ω$,
   wherein said BM frame layer has a thickness of 1.2±0.2 μm and an adhesion level of 5B.

2. The touch panel according to claim 1, wherein said metal wiring layer comprises a metal wire and a metal rake-shaped wire, said metal rake-shaped wire being arranged at the first portion of the ITO2 layer and located directly above the BM frame layer.

3. The touch panel according to claim 1, wherein said BM frame layer is made of a photosensitive material having a viscosity of 2-8 CPS.

4. The touch panel according to claim 1, wherein both of said window frame layer and the first portion of said ITO2 layer are lapped on the upper surface of the BM frame layer in a step-like shape, and an end of the window frame layer is contacted with an end of the first portion of the ITO2 layer.

5. A touch panel, comprising a glass substrate, a window frame layer, an ITO1 layer, an OC1 layer, an ITO2 layer, a metal wiring layer, and an OC2 layer, the ITO2 layer comprising a first portion which is directly contacted with the window frame layer and a second portion which is not in contact with the window frame layer, wherein:
   a BM frame layer is further provided on the substrate, the window frame layer and the first portion of the ITO2 layer is contacted with each other on a upper surface of the BM frame layer, and the BM frame layer has a

TABLE 1

| Window frame preparation classification | Preparation process | Preparation cost | Preparation yield | Environmental friendliness | Overall consideration |
| --- | --- | --- | --- | --- | --- |
| Printing process | Simple (washing, printing, baking) | Low (less preparation processes, simple processes) | 88% | No discharge of chemical solutions as well as wastewater and exhaust gas | Optimal |
| Yellow light photolithography | Complex (coating, pre-baking, exposure, development, post-baking, high temperature baking) | High (cumbersome preparation processes, high process requirements) | 71% | discharge of chemical solutions as well as wastewater and exhaust gas | Poor | width of 0.1 mm to 0.8 mm and is made of a photosensitive material having an insulation resistance≥$10^{12}$Ω,
wherein said window frame layer, ITO1 layer, OC1 layer, ITO2 layer, metal wiring layer and OC2 layer on the substrate have a total thickness of 16.82 μm-38 μm.

6. The touch panel according to claim 5, wherein said window frame layer has a thickness of 12 μm-30 μm; said ITO1 layer has a thickness of 100 Å-1500 Å; the OC1 layer has a thickness of 0.5 μm-2.0 μm; the ITO2 layer has a thickness of 100 Å-1500 Å; the metal wiring layer has a thickness of 25000 Å-35000 Å; and the OC2 layer has a thickness of 2.0±0.2 μm.

7. The touch panel according to claim 5, wherein each of said window frame layer, ITO1 layer, OC1 layer, ITO2 layer, metal wiring layer, and OC2 layer has an adhesion level of 5B.

8. The touch panel according to claim 5, wherein said metal wiring layer comprises a metal wire and a metal rake-shaped wire, said metal rake-shaped wire being arranged at the first portion of the ITO2 layer and located directly above the BM frame layer.

9. The touch panel according to claim 5, wherein said BM frame layer is made of a photosensitive material having a viscosity of 2-8 CPS.

10. The touch panel according to claim 5, wherein both of said window frame layer and the first portion of said ITO2 layer are lapped on the upper surface of the BM frame layer in a step-like shape, and an end of the window frame layer is contacted with an end of the first portion of the ITO2 layer.

11. A method of preparing a touch panel, the touch panel comprising a glass substrate, a window frame layer, an ITO1 layer, an OC1 layer, an ITO2 layer, a metal wiring layer, and an OC2 layer, the ITO2 layer comprising a first portion which is directly contacted with the window frame layer and a second portion which is not in contact with the window frame layer, wherein:
a BM frame layer is further provided on the substrate, the window frame layer and the first portion of the ITO2 layer is contacted with each other on a upper surface of the BM frame layer, and the BM frame layer has a width of 0.1 mm to 0.8 mm and is made of a photosensitive material having an insulation resistance≥$10^{12}$Ω,
the method comprising:
step one of preparing a designated BM frame layer on a substrate by using a piece of clear glass as a substrate and a photosensitive material having a viscosity of 2-8 CPS and an insulation resistance≥$10^{12}$Ω as a raw material to obtain a first substrate;
step two of preparing a designated ITO1 layer, an OC1 layer, and an ITO2 layer successively on the first substrate in accordance with a designated pattern and position to obtain a second substrate, wherein on the second substrate, one end of the BM frame layer is directly contacted with the first portion of the ITO2 layer and the other end of the BM frame layer is provided with a portion to be in contact with the window frame layer;
step three of printing an ink material having an insulation resistance≥$10^{12}$Ω on the second substrate by printing process according to a designated window frame pattern and position, and then baking the substrate under 200-300° C. for 20-40 minutes, so that the ink is cured, to obtain a third substrate with the window frame layer;
step four of preparing a designated metal wiring layer and $OC_2$ layer on the third substrate according to the designated pattern and position, to obtain the touch panel, wherein said metal wiring layer comprises a metal wire and a metal rake-shaped wire, and the metal rake-shaped wire is provided on the first portion of the ITO2 layer and is directly above the BM frame layer.

12. The method of preparing a touch panel according to claim 11, wherein in the preparation of the BM frame layer in the step one, coating, pre-baking, exposure, development, post-baking, and baking processes in yellow light photolithography are successively employed;
in the coating, the coating rate is controlled at 70±20 mm/s, the gap value is controlled at 0.1±0.03 mm, and the coating pressure is controlled at 0.08±0.03 Mpa;
in the pre-baking, the pre-baking temperature is controlled at 110±10° C. and the pre-baking time is controlled at 25±1 s;
in the exposure, the exposure energy is controlled at 60±10 mj, the exposure gap value is controlled at 200±50 μm, and the temperature is controlled at 23±1° C.;
in the development, the temperature of the developer solution is controlled at 23±1° C., the conductivity is controlled at 10±2 ms/cm, and the flow rate is controlled at 4±0.5 m/min;
in the post-baking, the post-baking temperature is controlled at 130±10° C., and the post-baking time is controlled at 25±1 s;
in the baking, the baking temperature is controlled at 230±10° C., and the time is controlled at 30±5 min.

13. The method of preparing a touch panel according to claim 11, wherein in step three, parameters in the printing process are as follows:
an insulation resistance of the ink is larger than or equal to $10^{12}$Ω,
a mesh size of a printing screen is 300-500, a tension is 20-28 N,
an emulsion thickness is 6 μm-14 μm.

14. The method of preparing a touch panel according to claim 11, wherein in the step three, the optical density value of the window frame layer is greater than or equal to 4.

15. The method of preparing a touch panel according to claim 11, wherein in the step three, when printing a non-white window frame layer, the non-white window frame layer is prepared by one or more printing processes.

16. The method of preparing a touch panel according to claim 11, wherein in step three, when the white window frame layer is prepared by printing, a white ink layer is first printed and a black ink layer is then printed; the white ink layer has a thickness of 9 μm-21 μm and the black ink layer has a thickness of 3 μm-9 μm.

17. The method of preparing a touch panel according to claim 11, further comprising cutting and grinding the touch panel obtained in the step four into small pieces of product size, and then subjecting the touch panel to a secondary edge enhancement by hydrofluoric acid chemical solution to obtain a finished product, wherein in the cutting and grinding, the pressure is controlled at 0.4 Mpa-0.9 Mpa, the cutting depth is controlled at −0.03 mm to −0.07 mm, the grinding rod speed is controlled at 30000-42000 r/min, and the edge grinding feed amount is controlled at 12-15 mm/s.

* * * * *